United States Patent Office 3,194,651
Patented July 13, 1965

3,194,651
PROCESS AND APPARATUS FOR RECOVERING WASTE GASES FROM CONVERTERS IN STEEL WORKS
Gérald Namy, Saint-Etienne, and Jacques Dumont Fillon, Metz Queuleu, France, assignors to Institut de Recherches de la Sidérurgie Francaise, Saint-Germain-en-Laye (Seine-et-Oise), France, a professional institution of France
Filed July 17, 1962, Ser. No. 210,370
Claims priority, application France, July 28, 1961, 869,365, Patent 1,303,519; Aug. 18, 1961, 871,103, Patent 1,316,484; Mar. 15, 1962, 891,191, Patent 81,957
8 Claims. (Cl. 75—60)

This invention relates to a process and apparatus for collecting without combustion, extracting and recovering waste gases from steel converters using an oxygen blast.

It has for some time been known that it is advantageous to prevent the combustion of the CO-rich refining gases issuing from the mouth of a converter when working with a pure oxygen blast since this reduces the size of such steelwork installations and thus substantially diminishes investment costs. Furthermore the recovered gases may be utilized either as a fuel or for chemical purposes.

A process is already known for removing such gases through a removable sliding sleeve between the hood and the mouth of the converter, which sleeve bears on the converter jacket, the necessary suction being provided by any conventional means. A steam jet, for example, may provide a seal at the junction of the sleeve and the converter. Such a removable sleeve is advantageous due to its simplicity, but has certain disadvantages, the main ones being the impossibility of seeing the flame, the escape of gases or the blows from the converter, and the risk of flooding of the gas collecting installation in case of foaming or overflowing of the slag, such as frequently happens when using an oxygen blast.

Similarly, it is also known to collect refining gases from a steelworks converter using an oxygen blast through a non-sealed hood placed at a predetermined distance from the converter mouth, and in which a very accurate draught control enables a constant pressure practically equal to the external atmospheric pressure to be maintained. In this manner, the hot gases coming from the converter can be recovered without combustion.

The present invention relates to a process making use of such an open hood, in which the draught of the refining gases is regulated so as to prevent leaks of atmospheric air into an open bottom zone of the hood and of recovered gases out of this zone. The gases drawn from the converter mouth enter the hood through the open bottom zone of the hood in such a manner as to form a seal with the wall of the hood against the entry of atmospheric air beyond a horizontal plane in the lower part of the open bottom zone of the hood. The draught of the recovered gases is so controlled that the plane of the seal does not substantially rise or fall. For convenience sake, this plane of the seal is called the "gas level."

An object of the present invention is to provide a novel solution for the control of the draught in the hood, which, in certain cases, can simplify certain technological or working processes, such for example as the blocking of the pressure taps where the pressure is to be regulated within the hood.

Another object of the present invention is to detect and mitigate or even totally suppress the blow-back of gases, which may occur around the hood, due, for example, to irregularities in the refining process, in the form of abrupt increases in the flow volume of the gases issuing from the converter, or to accidental loss of control in the apparatus.

In the present process, gases emanating from the refining of pig-iron by pure oxygen are recovered without combustion in an open hood disposed at a predetermined distance above the converter, and the draught in a discharge pipe for the collected gases is so regulated as to prevent, as far as possible, air leaks and gas escapes. According to the invention, this process comprises the steps of measuring the temperature or detecting its fluctuations at at least one level located in the lower part of the hood to determine the position of the gas level, and controlling the draught in the discharge pipe so as to maintain a constant temperature within predetermined limits and consequently to maintain the lowest gas level at a substantially constant position.

Preferably, the process comprises detecting the presence of flames around the hood in order to disclose a lowering of the gas level below the lower edge of the hood by measuring the temperature and determing its fluctuations at not less than one level located outside the hood adjacent its lower part and thus producing as rapidly as possible an abrupt increase in the intensity of the draught when gas leaks occur over the major part of the internal periphery of the hood.

Preferably, also, the process comprises measuring the temperatures and detecting its fluctuations at two separate levels within the hood, and controlling the draught according to the temperatures measured at one of these levels, without regard to the gap between the temperatures measured at this level and a reference temperature, unless said gap is identical in sign and magnitude with the temperatures prevailing simultaneously at these two levels, a threshold value being fixed for this latter gap and below which the control is blocked and the draught maintained at its initial value.

The process preferably also comprises tapping a gas flow at the aforesaid level situated in the lower part of the hood and measuring its temperature as a means for controlling the draught value.

The present invention also includes an apparatus for carrying out the process in an installation for the recovery of refining gases and comprising an open hood placed above the converter, means for measuring the temperature or detecting the variations thereof of the gases contained in the lower part of the hood and means for influencing the draught in the discharge pipe in order to maintain the said temperature within predetermined limits.

Further features which may be embodied in the apparatus are:

(a) Means for measuring the temperatures or detecting temperature fluctuations, in particular: thermocouples, or gas thermometers, or photoelectric cells; or electrical resistance thermometers with a high temperature coefficient.

(b) Means for measuring the temperature or detecting temperature fluctuations placed in ducts opening into the hood and opening either directly to the outside air, or into a collector connected with suction means.

It will be appreciated that the invention is based on the fact that, if the draught is insufficient, the volume of the plug of hot gas in the hood will increase, the gas level will fall and, since this is the level at which a considerable, upward temperature gradient arises, the temperature will thus rise at this level. Conversely, if the draught is too great, the gas level will rise in the hood, and the temperature will then fall in the bottom zone of the hood below the gas level.

If the draught is regulated in such a manner that the gas level in the lower part of the hood remains constant, no variations being possible outside certain limits, the hood will thus be continuously charged with refining gases from its top to as far as the vicinity of this lower level, thus avoiding any appreciable inflow from the surrounding air. Similarly, gas escapes below such lower level are avoided and combustion of the gases outside the hood can thus be prevented.

On the other hand, it may happen, in the case of such refining gas collecting installations, that sudden increases in the flow volume of the refining gases cannot be immediately compensated or balanced, and a part of these gases will escape and burn outside the hood, before the regulating means have time to act. It will be possible to shorten and reduce the intensity of these back-blows by establishing, in accordance with the present invention, a temperature-measuring level at the very bottom of the hood, by means of temperature taps or flame detectors located at the edge of the hood or, alternatively, around this edge and outside the hood itself. These temperature taps or flame detectors are then so coordinated with the draught control that their heating has the effect of immediately producing an abrupt increase in the draught.

It will thus be seen that the present invention can also be applied to the complete control of a refining gas collecting installation for the purpose of regulating the blowback of gases outside the hood, in an installation in which the draught is regulated by any suitable means.

For the application of the present invention it will be particularly convenient to use thermocouples placed inside the hood in a horizontal plane disposed at the lower part thereof. In such simple conditions, the radiation from the flames which may issue from the converter, or an overflow of incandescent slag, may influence these thermocouples, the corresponding heat emission signaling to the regulating means a lowering of the gas level, which may introduce serious anomalies in the draught. To eliminate or minimize the influence of radiant heat, these thermocouples may be placed in small chimneys or funnels situated around the lower circumference of the hood, in such a manner that they are swept by the hot gases circulating in these small chimneys. The radiation from the metal bath, the flames, or overflowing slag, will not influence the result. These small chimneys or funnels, set more or less vertically, are made of small-diameter tubes connecting the interior of the hood with the outside air. The circulation of the hot gases within these tubes may be by natural means, or be accelerated by any suitable suction means, the cross-section of the chimneys and the characteristics of the exhauster being adapted to obtain high outflow velocities, having a favourable effect on the accuracy and rapidity of the measurements.

In practical use, however, it has been found that overflowing slag still exerts an influence, despite all precautions taken to protect the thermocouples. In actual fact, columns of hot air are formed at the edges of the overflowing slag pools, which exert an influence on the thermocouples, and cause wrong signals to disturb the regulation of the draught. By measuring the temperatures at two different levels in the bottom of the hood, such erroneous signals can be detected. Actually, in normal running, the temperatures at these two levels will always be different, but the deviation will always be in the same direction. When the thermocouples are exposed to a current of hot air caused by overflowing of the slag, this difference tends to disappear, and the temperatures become identical, or the temperature differences are even reversed. The regulating means can then be blocked, and the draught maintained at the level which it had at the beginning of the disturbance, the regulation being resumed as soon as the difference between the temperatures at the two levels has attained a suitable value.

Embodiments of the present invention will now be described, by way of example, with reference to the accompanying drawings, in which.

Figure 1:
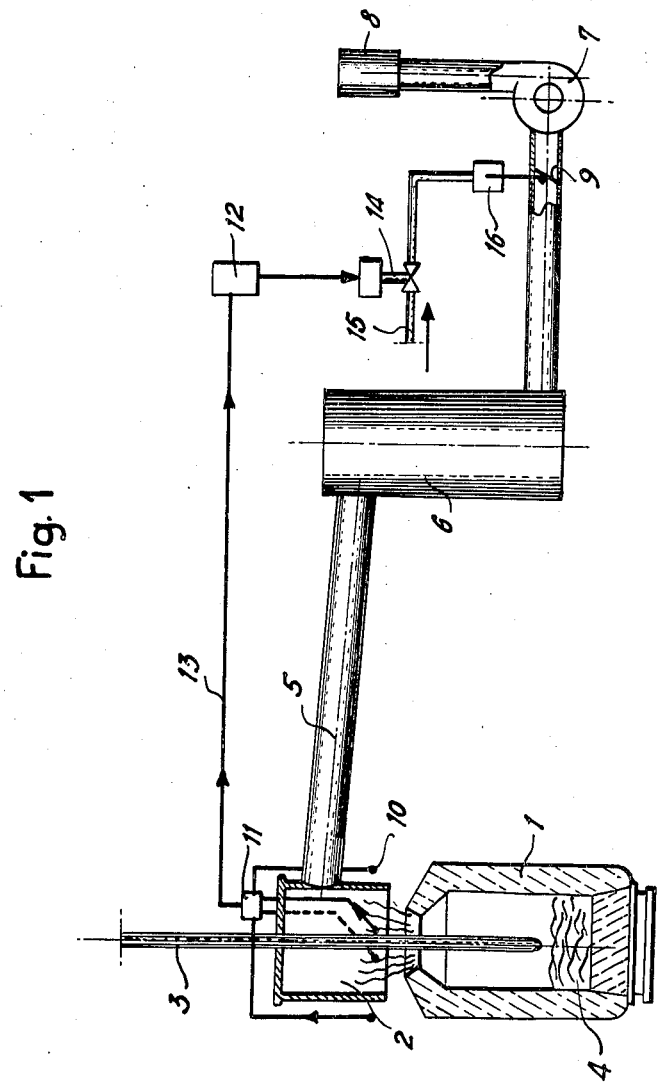
FIG. 1 is a diagrammatic view of apparatus for detecting and controlling leaks from the hood, and including a recovery installation with pressure regulation inside the hood.

The apparatus shown in FIG. 1 comprises a pig iron refining zone constituted by converter 1, of 5 tons capacity, above which a collecting hood 2 cooled by circulating water in the usual manner is arranged to constitute a chamber in communication with the surrounding air for recovering gases emanating from the refining zone.

In accordance with well-known refining procedures, a water-cooled lance 3 blows a jet of technically-pure oxygen, with or without pulverulent materials in suspension, into the pig-iron charge 4. The gases collected by the hood 2 are discharged through an exhaust conduit including a metal duct 5, cooled by a water spray, a conventional wet dust collector 6, an exhaust fan 7 and a combustion chimney 8 in which the CO is burnt to prevent its discharge into the atmosphere. The draught is controlled by means of a flap or valve 9 located in the suction pipe in such a manner that the gas pressure at the bottom of hood 2 remains constantly equal to the pressure of the surrounding atmosphere. For this purpose, the hood 2 is provided with pressure-measuring means (not shown). A well known pressure-measuring means is disclosed in French Patent No. 1,223,518.

For the purpose of detecting gas leaks from the hood, four thermocouples 10 of low inertia are arranged around the hood, the hot joints whereof are arranged at intervals $\pi/2$ in a horizontal plane about ten cm. above the lower edge of the hood. The electric potentials generated by these four thermocouples 10 are applied in series to a junction-box 11 and the resulting voltage applied to an electric threshold relay 12 of known kind through a compensating conductor 13.

This relay 12 only responds when the total voltage received by it from the thermocouples 10 is above 40 millivolts, corresponding to a temperature above 500° C. for the four thermocouples 10 taken together. The relay 12 actuates an electromagnetic valve 14 to admit compressed air supplied by a pipe 15 to a pneumatic ram or jack 16 coupled to the draught flap or valve 9. Thus, should any considerable leak develop around the hood, the thermocouples actuate the relay 12 which, in turn, releases the compressed air to operate jack 16 and open flap or valve 9. The latter responds promptly, and the resulting increased draught has the effect of stopping these leaks.

Figure 2:
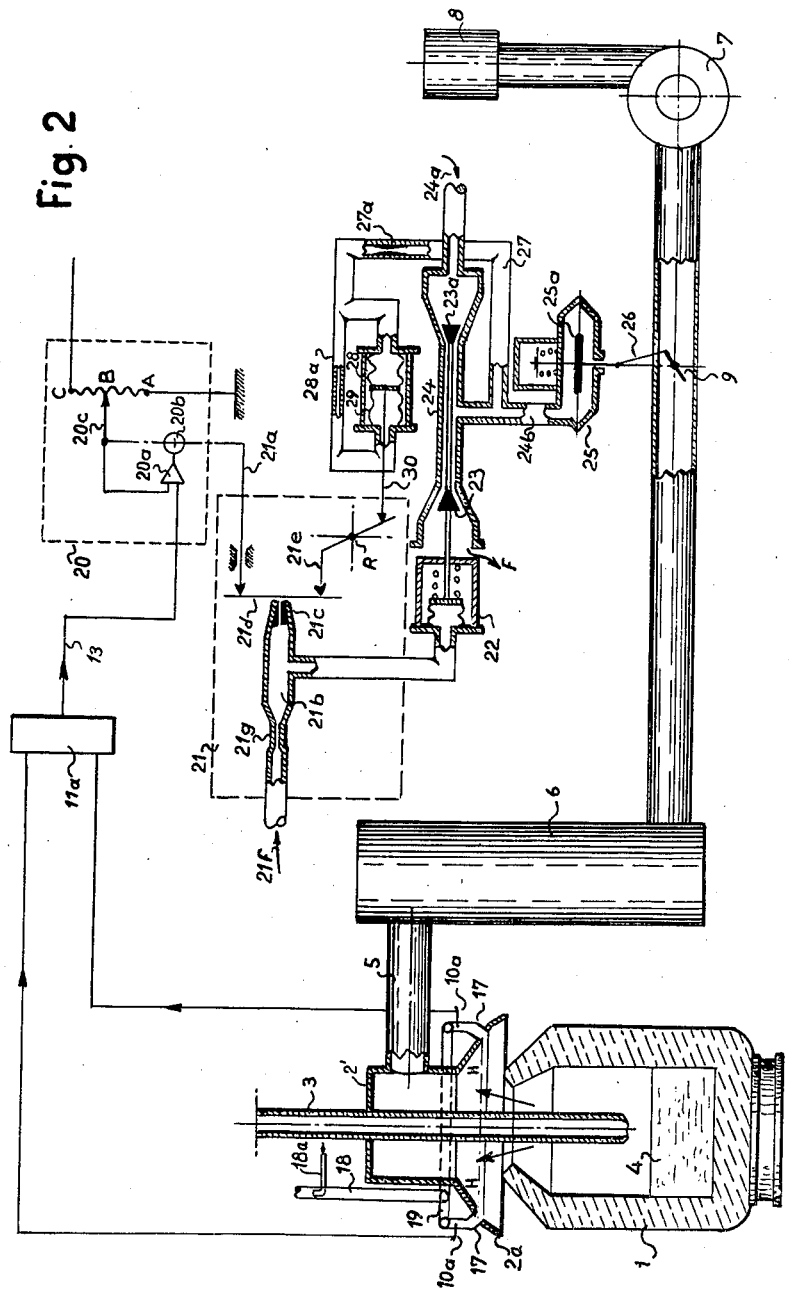
FIG. 2 is a diagrammatic view of a draught-regulating apparatus according to the present invention and is a modification of the apparatus of FIG. 1.

FIG. 2 shows a similar apparatus for collecting waste gases, and the same parts are designated by the same reference numerals. The apparatus thus comprises the converter 1, the lance 3 for blowing a jet of pure oxygen which may contain pulverulent materials in suspension into the bath 4, and the extraction pipe 5 cooled by a water spray, the wet dust-extractor 6, the draught fan 7, the combustion chimney 8 wherein the gases are burnt, and the draught flap or valve 9.

The gases escaping from the converter are collected under a hood 2' having a splayed part 2a taking up momentary fluctuations of the gas flow.

Thermocouples 10a are arranged in chimneys 17 which communicate with the splayed part of the hood at a low level H—H, and are uniformly distributed around the hood. The chimneys 17 are connected to a suction pipe 18 through a collector conduit 19. The draught in the pipe 18 is maintained by a compressed air nozzle 18a, which has the advantage of not requiring dust-cleaning of the collected gases.

The thermocouples 10a are fitted in the chimneys 17 in such manner as to be shielded from direct radiation when the converter slag overflows, which occurs at certain times.

The hood 2' is cooled by water circulation (not shown) in the usual manner.

The draught is regulated by means of the flap or valve 9, by a control unit to be hereinafter described so that the temperatures measured by the thermocouples are maintained within set limits, to be determined experimentally for each apparatus, for example between 400° and 600° C.

The combined electric potentials produced in the thermocouples are applied to a junction box 11a to which the thermocouples are connected in series, and the resulting voltage is fed through a compensated conductor 13 to an automatically registering potentiometer 20. This potentiometer is coupled with an amplifier 20a to apply the difference between the voltage to be measured (possibly that applied directly by the thermocouples) and a reference voltage tapped from the section AB of a calibrated wire AC to the terminals of which a known, constant reference voltage is applied.

The amplifier 20a feeds a small electric motor 20b, termed the balancing motor, which actuates a slider 20c moving along the calibrated wire AC to balance the circuit. When the reference voltage equals the voltage to be measured, the slider 20c stops. The position of the slider 20c is thus a measure of the voltages of the thermocouples 10a.

The position of the slider 20c of the potentiometer 20 with reference to a pre-set point representing the control point, is transmitted by a mechanical differential gear of known kind to a cursor 21a of a pneumatic position transmitter 21, in known manner, wherein a chamber 21b coacts with a nozzle 21c, and regulates the air pressure in dependence on the distance between this nozzle 21c which is fixed and a moving paddle 21d disposed in front of the nozzle. The position of this paddle 21d depends on that of the cursor 21a, and of a lever 21e, which will be described presently, and which serves to furnish a reactive force.

The chamber 21b is in communication at 21f with a source of compressed air (not shown) through a choke or venturi 21g, the cross-section whereof is of the same order of magnitude as the effective cross-section of the gas flow between the tip of the nozzle 21c and the paddle 21d when the latter is in the mid-position. Thus small fluctuations in the distance between the paddle and the nozzle induce considerable pressure variations in the chamber 21b, without preventing the rapid establishment of a balanced pressure in this chamber.

A manometer chamber 22 communicates with the chamber 21b, and the deflections of its manometer box control the action of valves 23 and 23a of a pneumatic pressure relay 24 supplied with compressed air at 24a, and coacting through a pipe 24b with a pneumatic membrane servomotor 25.

This servomotor 25 consisting of a deflecting elastic membrane 25a and a link element 26 constitutes, with the draught flap or valve 9, a pneumatically-controlled butterfly valve assembly, closable by pressure deficiency. The control pressure is variable over a standard range of 3 to 15 p.s.i., i.e., the flap or valve closes at 3 p.s.i. and opens fully at 15 p.s.i.

A pipe 27 with a capillary choke 27a connects the servomotor 25 with a first differential pressure gauge 28, and a second pressure gauge 29 in the same manometer box, through the capillary tube 28a.

The movable paddle 21d is actuated through the lever 21e, pivoting at R in accordance with the movements of a plunger or piston 30, which are proportional to the differences between the instantaneous pressures prevailing in the two gauges or capsules 28 and 29.

The operation of this apparatus will now be explained on the assumption of a disturbance caused by an abrupt decrease in the gas flow from the converter.

Since the suction is then too powerful, the gas level in the hood rises rapidly, and the temperature at the level H—H falls abruptly below its pre-set value, causing a corresponding decrease in the voltage of the thermocouples delivered to the automatic potentiometer 20 whose moving parts respond and move away from the pre-set point to lower values. Due to the construction of the arrangement, the slider 21a moves to the right, the paddle 21d moves way from the nozzle 21c, and consequently the pressure falls in the chamber 21b, and in the manometer chamber 22, which causes the valves 23 and 23a to move to the left in the relay 24, thereby reducing the flow of compressed air passing through the valve 23a and issuing at F, and causing a drop in the pressure above the membrane of the servomotor 25. The link 26 now starts to move rapidly upwards, reducing the opening of the flap or valve 9, and thus the draught. The discharge pressure of the pneumatic relay 24 is transmitted through the duct 27 to the differential pressure gauge 28, 29, the purpose of which is to provide a reactive force acting on the paddle 21d. The pressure is transmitted to gauge 28 with a delay due to a time constant depending on the volume of the chamber of gauge 28 and the capillary choke 27a, and to gauge 29 with a still greater delay, due to the time constant provided by the volume of the chamber of gauge 29 and the capillary tube 28a, thus producing two successive and opposite movements of the plunger 30 and the lever 21e, and so ultimately of the paddle 21d. The first of these movements presses the paddle towards the nozzle 21c with a slight offset, which retards the action of the regulator on the flap or valve 9, the second movement draws the paddle away from the nozzle, which finally suppresses the reactive force, and re-establishes the full action of the regulator.

The assembly formed by the pneumatic converter 21, the relay 24, and the reactive, differential manometer 28–29, forms a pneumatic governor of a kind well known in engineering, the proportional action whereof is derived from and linked with the action described, of the regulator in the presence of a disturbance. Actually, if the disturbance takes place very rapidly, the capillary choke 27a prevents the pressure variations from being too rapidly transmitted to the differential pressure-gauge 28–29, i.e., the reactive force of the latter is not exerted, and the regulator acts vigorously on the flap or valve 9. This explains the derived action, the response of the regulator being the greater the more rapid the disturbance. Similarly, if the disturbance develops very slowly, the pressure in the duct 27 is transmitted to the gauges 28 and 29 and the reactive force is not applied; this represents the total action. The reactive force is only applied over an average range of rate of change of the phenomena, neither too rapid nor too slow.

The pneumatic governor described above, for better comprehension of the general functioning of the apparatus, is well known and acts over a standard pressure range of 3–15 p.s.i.

The time constants of the derived and direct motions are controlled by varying the cross-sections of the capillary chokes 27a and 28a according to the characteristics of the installation to be controlled, as is the usual practice in this field. It will be understood that the invention is not restricted to the employment of the regulator described, and any other form of control, for example, by electrical or electropneumatic means, may be used.

As regards the draught control, it is not essential for the temperature measured by the thermocouples to be measured with any great accuracy. Actually, a certain degree of uncertainty regarding the position of the gas level in the hood can be admitted, without any considerable air leaks occurring. A low-gain governor can, consequently, be used, or even a floating governor without a reference point, but merely having a dead zone within which it does not respond. For instance, the draught may only be influenced when the mean measured temperature descends below 600° C., or rises above 800° C., unless other limits are found more suitable for a particular apparatus.

The present invention thus enables the level of the hot gases to be maintained between two levels adjacent to the level H—H, in the lower part of the hood. By such means, air leaks and gas escapes can be avoided by measuring the temperatures at the base of the hood, and controlling the draught accordingly.

As has already been mentioned, it has been found in practice that slag overflow has a disturbing influence on the temperatures recorded, despite any precautions taken for shielding the thermocouples from direct radiation.

Figure 3:
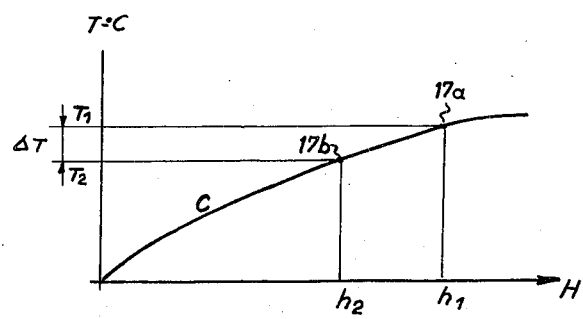
FIG. 3 is a graph showing a temperature curve at a selected level, according to the gas-recovery level.
Figure 4:
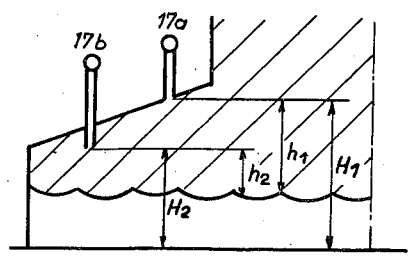
FIG. 4 illustrates diagrammatically the possible positions of temperature taps at two different levels.

A close study of the phenomena occurring in the hood has enabled a temperature curve C to be plotted for a given gas level, in relation to the thickness H of the gas layer. As shown in FIG. 3, the peak of curve C is attained when the gas level is at the bottom of the hood. This curve shows the existence of a constant relationship between the temperature measured by the thermocouple and the thickness of the gas layer below the corresponding (temperature) tap. By placing two temperature taps $17a$ and $17b$ at different levels $H_1$ and $H_2$ above the lower edge of the hood, as shown in FIG. 4 different temperatures will be observed, but the temperature differences will always be the same, i.e. one temperature will always be higher than the other. If the thickness of the gas layer under taps $17a$ and $17b$ is, respectively, $h_1$ and $h_2$, the corresponding temperatures will be $T_1$ and $T_2$, as shown by curve C in FIG. 3. If the taps are influenced by a current of hot air caused by overflowing slag, this gap tends to disappear, if the chimneys $17a$ and $17b$ are sufficiently close together. Control can then be performed as described above, by using the upper thermocouples for regulating the draught, and observing the deviation of the two levels. If this gap falls below a certain, threshold value, determined experimentally for the particular case it may be deduced that the observed temperature fluctuations are not due to displacement of the gas level, but to the action of the external disturbance. The governor is then blocked, and the draught flap or valve 9 held in its instantaneous position until the gap between the two levels is again greater than the threshold value.

The means for obtaining this holding position are not described here. They may consist, for example, of an electromagnet which cuts the flap or valve 9 off from its servomotor 25, and holds it in that position when the voltages supplied by the thermocouples are nearly at the threshold value. Anyone skilled in the art will have no difficulty in conceiving other arrangements for the same purpose.

We claim:

1. A process for the recovery of gases emanating from a pig iron refining zone, comprising the steps of recovering said gases in a chamber above said refining zone, said chamber having a wall defining an open bottom zone in communication with the surrounding air; drawing the recovered gases from the chamber through an exhaust conduit remote from the open bottom zone, the recovered gases forming a seal with the wall of the chamber against entry of atmospheric air in a horizontal plane in the lower part of the open bottom zone, measuring temperature fluctuations in said open bottom zone close to the refining zone, controlling the draught of the gases through the exhaust conduit in response to the measured temperature fluctuations in excess of a predetermined temperature fluctuation range whereby the temperature at the measured level is re-established within said range and said sealing plane is maintained at a substantially constant level to minimize leaks of surrounding air and recovered gases beyond said plane.

2. The process of claim 1, further comprising the steps of detecting the presence of flames in the surrounding air outside said chamber and adjacent said open bottom zone of the chamber, said flames indicating a lowering of the interface below said chamber and a leak of the recovered gases from said chamber into the surrounding air, and rapidly increasing the draught in response to the detection of the flames over a major portion of the periphery of the chamber.

3. The process of claim 1, wherein the temperature fluctuations are measured at two levels within said open bottom zone of the chamber and the draught is controlled in response to the measured temperature fluctuations at one of said levels, and further comprising the steps of measuring the temperature gap between said two levels and blocking the draught control when said gap falls below a threshold value whereby the draught is maintained unchanged.

4. The process of claim 1, further comprising the step of tapping the recovered gases in said open bottom zone of the chamber and measuring the temperature fluctuations of the tapped gases for controlling the draught.

5. Apparatus for the recovering of gases emanating from a pig iron converter, comprising a hood spaced from the converter, the space between the converter and the hood being surrounded by air of the atmosphere and said hood being in free communication with the atmosphere through said space, an exhaust conduit leaving said hood, an exhaust draught control means mounted in said conduit remote from said hood, means for measuring temperature fluctuations in part of the hood close to the converter, and means responsive to the measured temperature fluctuations for operating the draught control means.

6. The apparatus of claim 5, further comprising gas conduit means leading from said part of the hood to the atmosphere, said temperature fluctuation measuring means being arranged in said gas conduit means.

7. The apparatus of claim 5, further comprising gas conduit means leading from said part of the hood, a gas collecting conduit connected to said conduit means and receiving gases therefrom, a suction means attached to the gas collecting conduit for exhausting the gases, and said temperature fluctuation measuring means being arranged in said gas conduit means.

8. A process for the recovery of gases emanating from a pig iron refining zone, comprising the steps of recovering said gases in a chamber above said refining zone and being in communication with the surrounding air, drawing the recovered gases from the chamber through an exhaust conduit, measuring the temperature of the recovered gases in a part of said chamber close to the refining zone, and controlling the draught of the recovered gases through the exhaust conduit in response to the measured temperature, the draught being increased with an increase in the measured temperature and decreased with a decrease in the measured temperature.

References Cited by the Examiner

UNITED STATES PATENTS

| | | | |
|---|---|---|---|
| 2,801,161 | 7/57 | Murphy | 75—60 |
| 2,902,358 | 9/59 | Kalling et al. | 75—60 |
| 2,977,217 | 3/61 | Graef et al. | 75—60 |
| 3,010,820 | 11/61 | Graef et al. | 75—52 |

BENJAMIN HENKIN, *Primary Examiner.*